June 22, 1937.   E. L. HOLMES   2,084,845
ECHO SOUNDING APPARATUS
Filed Aug. 6, 1934   2 Sheets-Sheet 1

Edward Lowther Holmes
INVENTOR

Patented June 22, 1937

2,084,845

UNITED STATES PATENT OFFICE 2,084,845

ECHO SOUNDING APPARATUS

Edward Lowther Holmes, Ilford, England, assignor of one-third to Arthur Joseph Hughes, Essex, England, and one-third to Henry Hughes & Son, Limited, London, England, a British limited-liability company Application August 6, 1934, Serial No. 738,686. In Great Britain August 15, 1933

4 Claims. (Cl. 177—386)

This invention relates to improvements in echo sounding apparatus and has for one of its objects the provision of simple means whereby a steady indication of distance can be obtained accurately, definitely and reliably.

A further object of the invention is to constitute an installation for the measurement of distance by echo sounding apparatus which can be arranged to operate recording apparatus or to operate as a reliable alarm when a predetermined distance occurs.

It is to be understood that the construction of the sound or other wave transmitter, the echo receiver and the thermionic amplifier associated therewith form no part of the present invention which is restricted to the attainment of an indication of the distance travelled by the signal and its echo by ascertaining the period of time occupied for such travel, and that the use of the word "sound" does not restrict the invention to installations employing audible sound inasmuch as the signal wave may be inaudible to the ear.

This invention consists in the arrangement of a distance indicator for echo sounding apparatus in which the measured distance is ascertained from the steady angular displacement from zero position of a pivoted system influenced magnetically by a train of flux impulses produced in a rotating electro-magnetic system and controlled by the electrical impulses delivered when an echo is received, the said electro-magnetic system being rotated in timed relation with the signals from the transmitter.

In order that the nature of this invention may be the better understood I will now proceed to describe the same in relation to the accompanying drawings which show different arrangements by way of example for obtaining a visual indication of distance, similar reference characters referring to similar or equivalent parts in the several figures in which:—

Echo sounding installations according to the present invention employ an electro-magnetic instrument capable of giving an indication of distance as an angle, for example by means of a scale and pointer, said electro-magnetic instrument generally being energized through a relay system discharged by the echo impulse in timed relation with the operation of the sound wave transmitter by means of switch contrivances associated therewith mechanically.

Figures 1, 2:
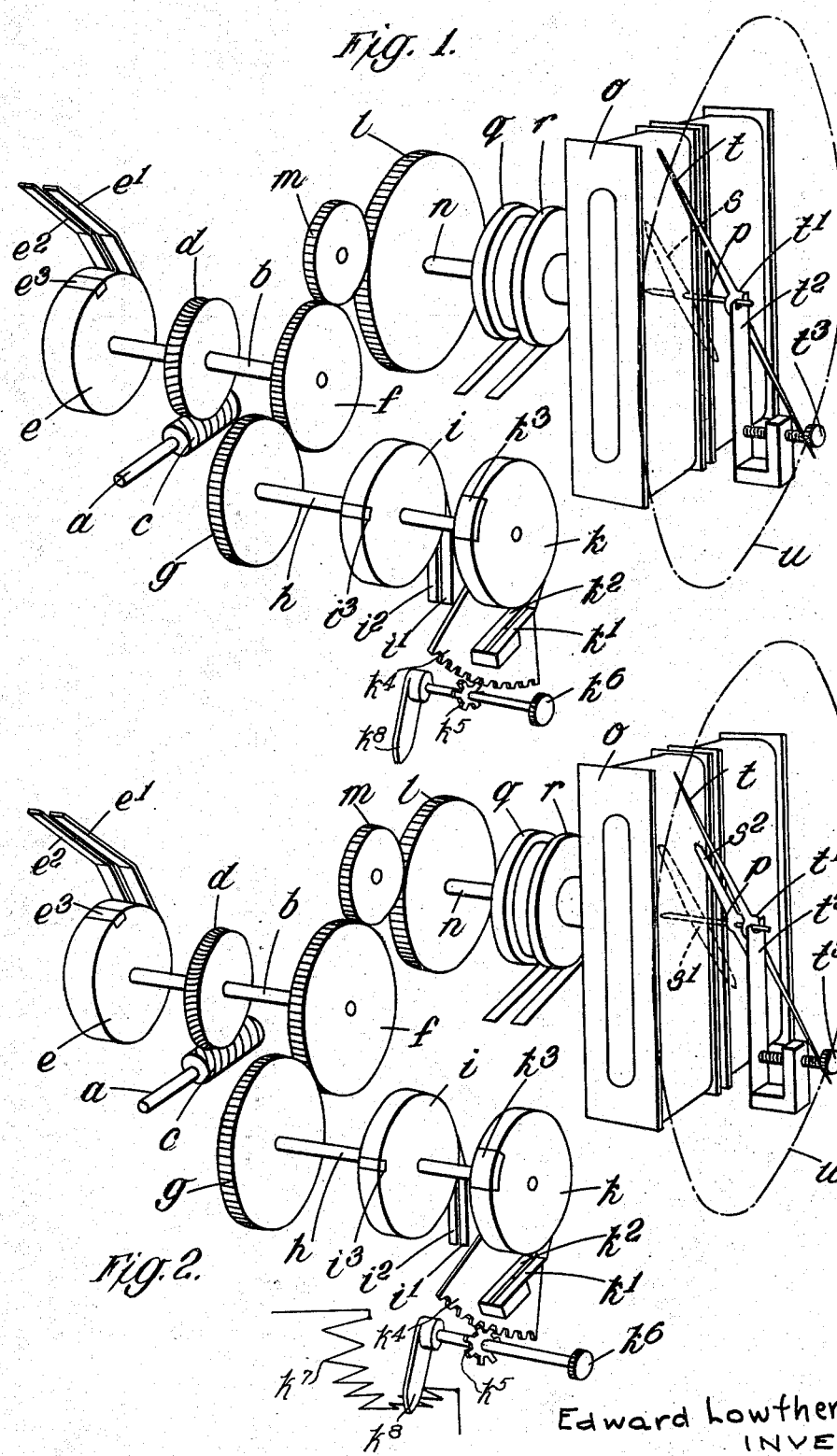
Figure 1 shows diagrammatically one form of indicating apparatus arranged according to this invention.
Figure 2 shows diagrammatically another form of indicating apparatus arranged according to this invention and adapted to enable the angular range of the scale to be extended relatively to the scale range of the apparatus shown in Figure 1.

As shown in Figure 1 the indicating instrument comprises a main driving shaft $a$ rotated at a constant speed by an electric motor (not shown) controlled by an automatic governor of known kind.

The main driving shaft $a$, by means of a worm $c$ and worm wheel $d$, rotates a spindle $b$ having a switch drum $e$ and gear wheel $f$ mounted thereon, said gear wheel $f$ meshing with a gear wheel $g$ of similar diameter on a spindle $h$ having switch drums $i$ and $k$ mounted thereon, so that the switch drums $e$, $i$ and $k$ are rotated at the same speed.

The gear wheel $f$ also entrains a gear wheel $l$ of twice the diameter through an idler $m$, said gear wheel $l$ being mounted on a spindle $n$ carrying two slip rings $q$ and $r$ and a solenoid coil $o$ arranged transversely in two parts which are connected in electrical series or parallel and are arranged end to end and separated to provide a small space through which an arbor $p$ can pass.

The arbor $p$ has towards one end a soft iron armature $s$ located in the hollow core of the coils of the solenoid $o$, and towards the other end a pointer $t$ which operates in relation to a scale $u$ graduated, for example in fathoms.

From the above it will be evident that the transversely arranged coils of the solenoid $o$ are rotated at half the speed of the switch drums $e$, $i$ and $k$.

The relay system associated with the above may be of any kind or type in which the time factor is appropriated to the measurements to be made and may be constituted by electro-magnetic contact devices or thermionic devices.

Generally a thermionic relay has been found to be necessary when dealing with ordinary depths of from one to five hundred fathoms and the following description includes such a device.

Figure 3:
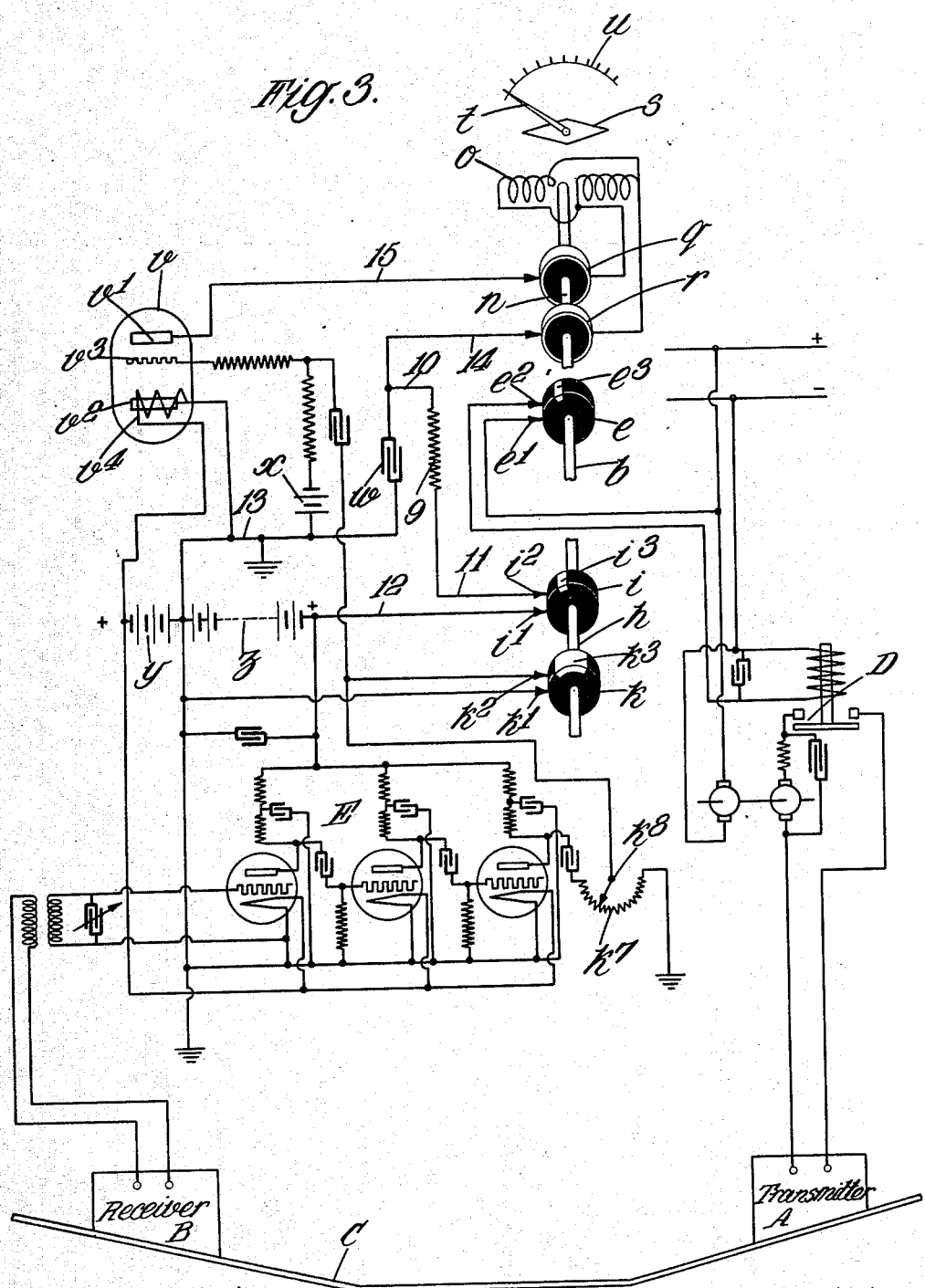
Figure 3 is a diagram showing the electrical connection between the several parts.

A thermionic relay system suitable for use with the present invention, and as shown in Figure 3, includes a known gas discharge triode $v$, that is to say, a valve structure usually comprising an anode $v^1$, a cathode $v^2$, a grid $v^3$ and heating means $v^4$ immersed under proper conditions in a suitable gas such as neon; a condenser $w$, a grid battery $x$, a heater battery $y$ and a high tension battery $z$.

As shown in Figure 3 the improved indicator is included in an installation comprising a magneto striction transmitter A and a receiver B of similar kind mounted on the shell C of the ship, a contactor D and an echo signal amplifier E shown as a simple arrangement of thermionic valves with resistance-capacity couplings.

The operation of the installation during duty is as follows:—

At 0° of rotation of the spindle $h$ (Figure 1) the blades $k^1$, $k^2$ contact with the bar $k^3$ on the drum $k$ (Figures 1 and 3) and short circuit the output from the amplifier E so as to "cover up" the triode $v$ and protect it from initial interference by the preliminary switching operations and by the transmitter A when emitting its signal and directly vibrating the receiver B.

At, say, 2° of rotation of the spindle $h$ the blades $i^1$, $i^2$ contact with the bar $i^3$ on the drum $i$ (Figures 1 and 3) thus including the condenser $w$ (Figure 3) in circuit with the high tension battery $z$ through the resistance 9 and the conductors 10, 11, 12 and 13 for charging purpose.

This contact is maintained for say 12° of rotation, that is to say, the bar $i^3$ moves from under the blades $i^1$, $i^2$ after the spindle $h$ has completed about 14° of rotation. Also at 2° of rotation of the spindle $h$ when the spindle $b$ will have rotated through 2° from the starting position the blades $e^1$, $e^2$ contact with the bar $e^3$ of the switch drum $e$ (Figures 1 and 3) so that the operation of the contactor D is effected with the result that at about 14° of rotation of the spindle $h$ the transmitter A is actuated in known manner and the bar $e^3$ moves from under the blades $e^1$, $e^2$ thus interrupting the flow of current to the contactor.

At about 50° of rotation of the spindle $h$ the bar $k^3$ moves from under the blades $k^1$, $k^2$ thus leaving the gas discharge triode $v$ sensitive to the receipt of an impulse through the amplifier E of an echo signal.

When the signal is received from the amplifier E it reduces the negative grid bias of the gas discharge triode $v$ with the result that the condenser $w$ is discharged with great rapidity through the coils of the solenoid $o$, the conductors 13, 14, and 15 and the path between the anode $v^1$ and cathode $v^2$, the gas in the triode being extinguished almost immediately inasmuch as the anode circuit is without any applied E. M. F. when the condenser is discharged.

From the above it will be seen that the transversely arranged coils of the solenoid $o$ are energized electrically only at that instant of time when the impulse from the amplifier E reaches the grid $v^3$ but it is not effected by the subsequent reverberations so that the magnetic axis of the momentary flux produced in the transversely arranged coils of the solenoid $o$ is defined in angular position relatively to 0° of rotation of the spindle $h$ with great accuracy and it will be clear that as these flux impulses are produced repeatedly, at about three times per second, the soft iron armature $s$ entrained by the magnetic flux will take up an angular position indicating that period of time, as an angle, which elapses between the moment of initiation of the signal by the switch structure $e$, $e^1$, $e^2$, $e^3$ and the discharge of the triode $v$ by the echo signal so that the scale can be calibrated in linear measure, say fathoms, by deducting the various incidental time lags of constant value from the time period.

In order to obtain readings in shallow water of less than, say about fifteen fathoms deep, the blades $k^1$, $k^2$ are mounted on a toothed sector $k^4$ which can be rotated through any required angle about the axis of the drum $k$ by means of the pinion $k^5$ and finger wheel $k^6$ thus enabling the blades $k^1$, $k^2$ to be displaced so that the triode $v$ can be energized by the echo of a signal that has traversed a short distance only, say one or two fathoms. This exposure of the triode $v$ to an early echo necessitates a reduction in the sensitivity of the amplifier E which is effected automatically by an amplifier controlling resistance $k^7$, the controlling finger $k^8$ of which is operated simultaneously by the finger wheel $k^6$.

As the pointer system of the indicator described above and illustrated in Figure 1 is non-polarized in character it will be obvious that the angular displacement of the pointer $t$ cannot exceed 180° in range and the pointer $t$ must be double ended inasmuch as the soft iron armature $s$ can be entrained in alternative axial positions by the magnetic flux in the solenoid $o$. If a greater scale range is required this can be obtained by substituting an astatic magnetic system for the soft iron armature $s$.

As illustrated in Figure 2 the shaft $a$ rotates the spindles $b$, $h$ and $n$ at the same speed so that the coils of the solenoid $o$ are rotated at the same speed as that of the switch drums $e$, $i$ and $k$.

The magnets $s^1$, $s^2$ of the astatic system are mounted on the pivoted arbor $p$, the magnet $s^1$ being located within the tunnel of the coils of the solenoid $o$ whilst the magnet $s^2$ and pointer $t$ are located externally to the solenoid $o$ so that although in well known manner the astatic system consisting of the magnets $s^1$, $s^2$ is not affected by extraneous magnetic fields the polarity of the individual magnets is such that the system is affected, in a particularly effective way, by the magnetic flux produced when the coils of the solenoid $o$ are energized electrically.

It will be understood that the various spindles, shafts and arbors illustrated in Figures 1 and 2 are mounted in bearings suitably arranged for the purpose in order to produce a mechanical structure with the rotating parts properly constrained and that in order to obviate any difficulties in maintaining the pointer $t$ steady when the magnetic responsive elements associated therewith are not entrained closely by the magnetic flux impulses, friction means, such for example, as a small disc $t^1$ on the arbor $p$ and a forked spring blade $t^2$ arranged to engage frictionally therewith may be provided, the degree of frictional engagement being under the control of an adjusting screw $t^3$ or the like.

Clearly, the invention may be employed with sound or other wave transmitters and echo receivers mounted on aeroplanes and operating in any direction, and in some cases the solenoid coil may be replaced by an electro-magnet.

In the establishment of such an installation in practice many variations and modifications may be made without departing from the invention and the above description must be regarded as by way of example only as it will be obvious that the invention may be developed in many ways and be employed, for example to actuate an alarm or a recording mechanism of known kind.

I claim:—

1. In echo sounding apparatus emitting sound pulses, receiving echoes thereof and generating electrical pulses therefrom, a distance indicator having in combination an electrical winding mounted fixedly on a spindle arranged transversely to the magnetic axis of said winding, means for continuously rotating said spindle in step with the sound impulses, an elongated armature, means pivotally supporting the armature about a transverse axis of the armature with the said axis aligned with the spindle and the armature in close proximity with said winding, brushes, slip rings mounted on said spindle, cooperating with said brushes and electrically connected to said winding and means for the ascertainment of the angular dislacement of said armature from zero position.

2. In echo sounding apparatus emitting sound pulses, receiving echoes thereof and generating electrical pulses therefrom, a distance indicator having in combination a solenoid coil structure mounted fixedly on a spindle arranged transversely to the magnetic axis of said coil structure, means for continuously rotating said spindle in step with the sound pulses, an elongated soft iron armature, an arbor pivotally supporting the armature about a transverse axis of the armature with said axis aligned with the spindle and the armature located within the solenoid coil, a pointer on said arbor, a scale in proximity with said pointer to enable the angular displacement of the armature from zero position to be ascertained, brushes and slip rings mounted on said spindle cooperating with said brushes and electrically connected to said coil.

3. In echo sounding apparatus emitting sound pulses, receiving echoes thereof and generating electrical pulses therefrom, a distance indicator having in combination an electrical winding mounted fixedly on a spindle arranged transversely to the magnetic axis of said winding, means for continuously rotating said spindle in step with the sound pulses, a magnetic core within said winding, an elongated soft iron armature, means pivotally supporting the armature about a transverse axis of the armature with the said axis aligned with the spindle and the armature in close proximity with said magnetic core, brushes, slip rings mounted on said spindle cooperating with said brushes and electrically connected to said winding and means for the ascertainment of the angular displacement of said armature from zero position.

4. In echo sounding apparatus emitting sound pulses, receiving echoes thereof and generating electrical pulses therefrom, a distance indicator having in combination a solenoid coil structure mounted fixedly on a spindle arranged transversely to the magnetic axis of said coil structure, means for continuously rotating said spindle in step with the sound pulses, two magnetized elongated armatures to form an astatic pair, an arbor pivotally supporting said armatures about a transverse axis of the armatures with said axis aligned with the spindle and one of the armatures located within the solenoid coil, a pointer on said arbor, a scale for the ascertainment of the angular displacement from zero position of said pointer, brushes and slip rings mounted on said spindle cooperating with said brushes and electrically connected to said coil.

EDWARD LOWTHER HOLMES.